United States Patent
Kang et al.

(10) Patent No.: US 9,666,918 B2
(45) Date of Patent: May 30, 2017

(54) LITHIUM OXYGEN BATTERY AND ELECTROLYTE COMPOSITION

(71) Applicants: International Business Machines Corporation, Armonk, NY (US); Central Glass Co., Ltd., Tokyo (JP)

(72) Inventors: Seok J. Kang, San Jose, CA (US); Bryan D. McCloskey, Campbell, CA (US); Takashi Mori, Tokyo (JP); Satoru Narizuka, Tokyo (JP); Gregory M. Wallraff, San Jose, CA (US)

(73) Assignees: International Business Machines Corporation, Armonk, NY (US); Central Glass Co., Ltd., Tokyo (JP)

( * ) Notice: Subject to any disclaimer, the term of this patent is extended or adjusted under 35 U.S.C. 154(b) by 255 days.

(21) Appl. No.: 14/228,653

(22) Filed: Mar. 28, 2014

(65) Prior Publication Data

US 2015/0280296 A1    Oct. 1, 2015

(51) Int. Cl.
*H01M 12/08* (2006.01)
*H01M 4/38* (2006.01)

(52) U.S. Cl.
CPC ........... *H01M 12/08* (2013.01); *H01M 4/382* (2013.01); *H01M 2300/0028* (2013.01); *H01M 2300/0034* (2013.01); *Y02E 60/128* (2013.01)

(58) Field of Classification Search
CPC .............. H01M 12/08; H01M 4/382; H01M 2300/0034; H01M 2300/0028; H01M 60/128
See application file for complete search history.

(56) References Cited

U.S. PATENT DOCUMENTS

| | | | |
|---|---|---|---|
| 5,750,730 A | 5/1998 | Nakano et al. | |
| 7,402,260 B2 | 7/2008 | Segawa et al. | |
| 7,670,724 B1 | 3/2010 | Chan et al. | |
| 7,731,765 B2 | 6/2010 | Johnson | |
| 8,435,679 B2 | 5/2013 | Lamanna et al. | |
| 8,465,877 B2 | 6/2013 | Hase et al. | |
| 8,470,477 B2 | 6/2013 | Miwa et al. | |
| 8,475,688 B2 | 7/2013 | Chen et al. | |
| 2010/0239914 A1 | 9/2010 | Mikhaylik et al. | |
| 2013/0108932 A1* | 5/2013 | Onozaki ........... | H01M 10/0525 429/338 |

FOREIGN PATENT DOCUMENTS

| | | |
|---|---|---|
| JP | 09007635 A | 1/1997 |
| JP | 3557724 B2 | 8/2004 |
| WO | 2012011507 A1 | 1/2012 |

OTHER PUBLICATIONS

Girishkumar et al., "Lithium—Air Battery: Promise and Challenges," The Journal of Physical Chemistry Letters, vol. 1, Issue 14, Jul. 2, 2010, pp. 2193-2203, 11 pp.

McCloskey et al., "Limitations in Rechargeability of Li-O2 Batteries and Possible Origins," The Journal of Physical Chemistry Letters, vol. 3, Issue 20, Oct. 1, 2012, pp. 3043-3047, 5 pp.

McCloskey et al., "Solvents' Critical Role in Nonaqueous Lithium—Oxygen Battery Electrochemistry," The Journal of Physical Chemistry Letters, vol. 2, Issue 10, Apr. 27, 2011, pp. 1161-1166, 6 pp.

* cited by examiner

*Primary Examiner* — Laura Weiner
(74) *Attorney, Agent, or Firm* — Shumaker & Sieffert, P.A.

(57) ABSTRACT

A battery employing lithium-oxygen chemistry may include an anode comprising lithium, an electrolyte, and a porous cathode. The electrolyte may include a lithium-containing salt; a partially fluorinated ether, such as 2,2-bis(trifluoromethyl)-1,3-dioxolane; and a co-solvent selected from the group consisting of ethers, amides, nitriles, and combinations thereof. In some examples, the electrolyte does not include a cyclic carbonate ester, a sulfolane, or a sulfolane derivative. The porous cathode allows oxygen to come into contact with the electrolyte.

7 Claims, 4 Drawing Sheets

LITHIUM OXYGEN BATTERY AND ELECTROLYTE COMPOSITION

TECHNICAL FIELD

The disclosure relates to batteries employing lithium-oxygen chemistry.

BACKGROUND

Battery technology is continually being developed to enable higher energy density and greater efficiency, thereby permitting the use of batteries as power sources for more applications. For example, there is currently a great drive toward the use of batteries for electric vehicle propulsion. Current battery technologies, such as lead-acid and lithium ion batteries, have a lower gravimetric energy density (e.g., expressed as watt-hours per kilogram; Wh/kg) than is desired for use in extended range electric vehicles. Other applications for battery technology may also benefit from battery technologies that provide a higher energy density.

A rechargeable lithium-oxygen ($Li$—$O_2$) battery can store, theoretically, about 5-10 times more energy than current lithium ion batteries. The high energy density makes the $Li$—$O_2$ battery very attractive as an emerging energy storage system for a wide range of applications, including the propulsion of electric vehicles. A $Li$—$O_2$ battery is composed of a Li anode, an air cathode, where oxygen is accessed from the external environment, and an electrolyte containing Li salts, which is in contact with both the anode and cathode. In some examples, oxygen may be provided from air, in which case, the battery may be referred to as a Li-air battery.

Some configurations of $Li$—$O_2$ batteries employ an aprotic, nonaqueous electrolyte to impart ionic conductivity between a Li-bearing anode and a porous cathode. The porous nature of the cathode allows oxygen harvested from air to diffuse into the battery and react electrochemically with Li ions. The electrolyte may include a lithium salt (e.g., trifluoromethanesulfonimide, triflate, perchlorate, etc.) dissolved in a liquid organic solvent (e.g., an ether, an amide, a carbonate, etc.).

SUMMARY $Li$—$O_2$ batteries operate by reduction of $O_2$ to form lithium peroxide ($Li_2O_2$) on the cathode during discharge, with the process being reversed on charge. Because the chemistry during battery operation is related to generation of highly reactive peroxides (e.g., $Li_2O_2$) and transient intermediates, such as $LiO_2$, the chemical stability of the electrolyte affects whether the $Li$—$O_2$ battery performance is stable over repeated charges and discharges. This disclosure describes a solvent mixture for use in an electrolyte. The solvent mixture includes a partially fluorinated cyclic ether, such as 2,2-bis(trifluoromethyl)-1,3-dioxolane (TFDOL), and a co-solvent selected from the group consisting of ethers, amides, nitriles, and combinations thereof. In some examples, the electrolyte does not include a cyclic carbonate ester, a sulfolane, or a sulfolane derivative. The TFDOL may be substantially stable in the presence of active lithium oxygen electrochemistry, while the co-solvent may provide acceptable Li-salt solubility, and hence Li-ion conductivity.

In one example, the disclosure describes a battery employing lithium-oxygen chemistry. The battery includes an anode comprising lithium, an electrolyte, and a porous cathode. In accordance with this example, the electrolyte includes a lithium-containing salt, 2,2-bis(trifluoromethyl)-1,3-dioxolane, and a co-solvent selected from the group consisting of ethers, amides, nitriles, and combinations thereof. The electrolyte does not include a cyclic carbonate ester, a sulfolane, or a sulfolane derivative. The porous cathode allows oxygen to come into contact with the electrolyte.

In another example, the disclosure describes a battery employing lithium-oxygen chemistry. The battery includes an anode comprising lithium, an electrolyte, and a porous cathode. In accordance with this example, the electrolyte includes a solvent mixture comprising 2,2-bis(trifluoromethyl)-1,3-dioxolane and a co-solvent selected from the group consisting of ethers, amides, and nitriles; and a lithium-containing salt dissolved in the solvent mixture. The 2,2-bis(trifluoromethyl)-1,3-dioxolane and the co-solvent constitute more than half of the solvent by weight. The porous cathode allows oxygen to come into contact with the electrolyte.

In a further example, the disclosure describes a battery employing lithium-oxygen chemistry comprising an anode comprising lithium; an electrolyte, and a porous cathode allowing oxygen to come into contact with the electrolyte. The electrolyte may include a lithium-containing salt, a partially fluorinated cyclic ether, and a co-solvent. In accordance with this example, the electrolyte does not include a cyclic carbonate ester, a sulfolane, or a sulfolane derivative.

In an additional example, the disclosure describes an electrolyte for a battery employing lithium-oxygen chemistry, the electrolyte comprising a lithium-containing salt; and a solvent mixture comprising 2,2-bis(trifluoromethyl)-1,3-dioxolane and a co-solvent selected from the group consisting of ethers, amides, nitriles, and combinations thereof. In accordance with this example, the electrolyte does not include a cyclic carbonate ester, a sulfolane, or a sulfolane derivative.

The details of one or more embodiments of the invention are set forth in the accompanying drawings and the description below. Other features, objects, and advantages of the invention will be apparent from the description and drawings, and from the claims.

Figure 1:
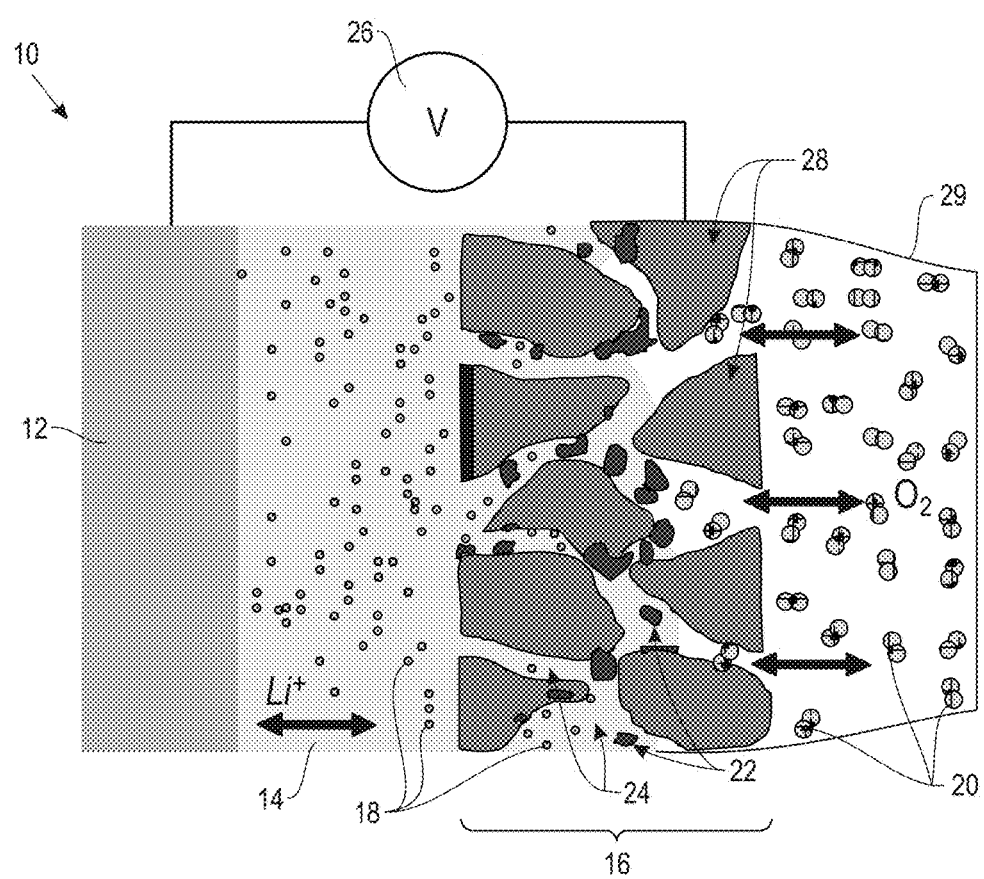
FIG. 1 is a conceptual and schematic diagram illustrating an example of an aprotic lithium-oxygen battery.

DETAILED DESCRIPTION $Li$—$O_2$ batteries may provide a relatively high gravimetric energy density (watt-hours per kg; Wh/kg), e.g., compared to lithium ion or lead-acid batteries. The theoretical gravimetric energy density of a $Li$—$O_2$ battery is about 11,680 Wh/kg, which is calculated using the oxidation of 1 kg of lithium metal. This energy density compares favorably to the gravimetric energy density of gasoline, the current fuel of choice for vehicles, which is about 13,000 Wh/kg.

Other considerations also impact the design and function of Li—$O_2$ batteries. For example, the power density (measured in watt per kilogram; W/kg) is important for propulsion of a vehicle. The power density of Li—$O_2$ batteries is currently low. While not wishing to be bound by any theory, current research results indicate that the mechanism of energy discharge in a Li—$O_2$ battery is reduction of oxygen in the presence of lithium ions to form lithium oxides (such as lithium peroxide). Hence, very large surface areas are required to provide high power. For example, a battery with 100 kW power output at a cell voltage of 2.5 volts (V) and a current density of 25 milliamps per square centimeter (mA/cm$^2$) may require an internal surface area of 160 m$^2$.

A Li—$O_2$ battery may include one of four chemistries: aprotic liquid electrolyte, aqueous electrolyte, a mixed system including an aqueous electrolyte immersing the cathode and an aprotic electrolyte immersing the anode, and a solid-state battery including a solid electrolyte. The fundamental chemistry of energy storage and discharge is affected by the electrolyte surrounding the cathode. The Li—$O_2$ battery described in this disclosure includes a Li metal and/or alloy anode, a cathode including a conductive, porous material, and a lithium ion (e.g., Li$^+$) conducting, nonaqueous, aprotic liquid electrolyte, which is in contact with both the anode and the cathode.

Li—$O_2$ batteries operate by reduction of $O_2$ to form lithium peroxide (Li$_2$O$_2$) on the cathode during discharge, with the process being reversed on charge. Because the chemistry during battery operation is related to generation of superoxides and peroxides (e.g., Li$_2$O$_2$), which are highly reactive, the chemical stability of the aprotic electrolyte affects whether the Li—$O_2$ battery is stable over repeated charges and discharges. In some aprotic electrolytes, the electrolyte may decompose during operation of the battery as a result of proton abstraction from, and oxidative instability of, the liquid organic solvent in the presence of the active cathode electrochemistry (namely 2(Li$^+$+e$^-$)+ $O_2 \rightarrow$ Li$_2$O$_2$), which limits the battery's rechargeability.

This disclosure describes a solvent mixture for use in an electrolyte. The solvent mixture includes a partially fluorinated cyclic ether, such as 2,2-bis(trifluoromethyl)-1,3-dioxolane (TFDOL), and a co-solvent selected from the group consisting of ethers, amides, nitriles, and combinations thereof. In some examples, the electrolyte does not include a cyclic carbonate ester, a sulfolane, or a sulfolane derivative. Fluorination may improve the oxidative stability of organic compounds, and a C—F bond is much stronger than an analogous C—H bond, so fluorine substitution may improve a compound's resistance to reactions causing hydrogen abstraction. Therefore, the stability of the electrolyte employed in a Li—$O_2$ battery may be improved by using fluorine-substituted organic compounds, such as a partially fluorinated cyclic ether, as the electrolyte solvent. However, Li-salt solubility, and hence Li-ion conductivity, is relatively low in liquid organic solvents that are partially or completely fluorine-substituted, limiting the rate capability (how much energy can be extracted per unit time) of the battery.

In accordance with some examples of this disclosure, an aprotic electrolyte may include a solvent comprising a mixture of a partially fluorinated cyclic ether, such as TFDOL, with a non-fluorinated co-solvent, which may be selected from the group consisting of ethers, nitriles, amides, and combinations thereof. The partially fluorinated cyclic ether resists oxidation during discharge of the battery, and the non-fluorinated co-solvent provides acceptable Li-salt solubility, and hence Li-ion conductivity. In some examples, the mixture of the partially fluorinated cyclic ether and the non-fluorinated co-solvent may constitute a majority of the solvent mixture of the electrolyte. In this way, the aprotic electrolyte may include a mixture of the partially fluorinated cyclic ether and the non-fluorinated co-solvent, leading to improved rechargeability of the Li—$O_2$ battery while maintaining acceptable recharge and discharge rates.

FIG. 1 is a conceptual and schematic diagram that illustrates an example of a Li—$O_2$ battery 10. In some examples, Li—$O_2$ battery 10 may utilize an aprotic electrolyte, and may be referred to as an aprotic Li—$O_2$ battery. Li—$O_2$ battery 10 includes an anode 12, an electrolyte 14, and a cathode 16. Anode 12 and cathode 16 are electrically coupled to a voltage source 26.

Anode 12 includes lithium. In some examples, anode 12 consists essentially of lithium. In other examples, anode 12 may include lithium alloyed with one or more additional elements. In some implementations, anode 12 may include a thin film formed on a surface of anode 12. The thin film may be a lithium-ion conductive film, such as a lithium-ion-conducting polymer, a lithium-ion-conducting block co-polymer, a lithium-ion-conducting ceramic, or a lithium-ion-conducting polymer-ceramic composite. In some examples, a thin film of lithium-stable conductive material may be present between the lithium anode and the thin film.

Cathode 16 may include an electrically conductive material and a material that gives oxygen evolution reaction (OER) and oxygen reduction reaction (ORR) activity. In some examples, the same material may be electrically conductive and give ORR and OER activity. For example, cathode 16 may include carbon, an electrically conductive metal oxide, or the like. In some examples, cathode 16 may be chemically stable in the presence of OER and/or ORR products, such as superoxides and/or Li$_2$O$_2$.

Cathode 16 may be formed as a porous structure. Cathode 16 may include solid portions with pores and/or channels 24 formed between the solid portions. Pores and/or channels 24 allow contact between the oxygen molecules 20 and the Li$^+$ ions 18 from electrolyte 14 at the surface of cathode 16. In this way, pores and/or channels 24 may facilitate reduction of $O_2$ during discharging and oxidation of Li$_2$O$_2$ during charging.

Porosity of cathode 16 may be formed in a variety of ways, such as by forming the cathode 16 as a monolithic, porous structure using structure-directing materials, such as a surfactant and/or other sacrificial material. As another example, cathode 16 may be formed using a paste and a structural support. In some examples, the structural support may be conductive and act as a current collector. In other examples, the structural support includes an electrically non-conductive (e.g., insulating) material. Structural support materials include, but are not limited to, electrically conductive powders such as metal and/or carbon powders, woven or non-woven metal fibers, metal foam, woven or non-woven carbon fibers, or the like. Other materials for the structural support may include, for example, stainless steel mesh, aluminum (Al) mesh, nickel (Ni) foam, and carbon paper.

In some examples, an electrically structural support 28 may be electrically conductive and function as a current collector. Alternatively, cathode 16 may include a separate current collector. A current collector may include a material of suitable electrical conductivity that is electrically connected to cathode 16 and collects electrons generated at the cathode 16 during discharge of Li—O$_2$ battery 10 and provides a conductive path to an external electrical circuit to which Li—O$_2$ battery 10 is connected. Similarly, during recharge of Li—O$_2$ battery 10, the current collector provides an electrical pathway between an external voltage source and cathode 16 to supply voltage for decomposition of Li$_2$O$_2$ via the OER (described below). For example, the current collector may include electrically conductive powders such as metal and/or carbon powders, woven or non-woven metal fibers, metal foam, woven or non-woven carbon fibers, or the like.

Li—O$_2$ battery 10 also includes electrolyte 14. Electrolyte 14 includes a solvent and Li+ ions 18. Electrolyte 14 may include a non-aqueous solvent, such as an aprotic liquid. The aprotic liquid may include a mixture of a partially fluorinated cyclic ether, such as TFDOL, and a co-solvent. In some examples, the co-solvent may be selected from the group consisting of ethers, e.g., linear or cyclic aliphatic ethers; amides; nitriles; and combinations thereof. In some examples, the ethers in the co-solvent may be non-fluorinated. Examples of co-solvents include 1,2-dimethoxyethane, monoglyme, diglyme, triglyme, tetraglyme, N-methyl-2-pyrrolidone (NMP), dimethyl acetamide, pivalonitrile, and acetonitrile. The partially fluorinated cyclic ether resists oxidation during discharge of Li—O$_2$ battery 10, and the non-fluorinated co-solvent selected from the group consisting of ethers, nitriles, amides, and combinations thereof provides acceptable Li-salt solubility, and hence Li+ ion 18 conductivity.

The ratio between the partially fluorinated cyclic ether and the co-solvent may be selected based on the identity of the co-solvent. In general, the volumetric ratio between the partially fluorinated cyclic ether and the co-solvent may be between about 30:1 and about 1:1. In some examples, the volumetric ratio between the partially fluorinated cyclic ether and the co-solvent may be between about 30:1 and about 5:1, or between about 20:1 and about 10:1.

In some examples, the mixture of the partially fluorinated cyclic ether and the co-solvent may be mixed with a second co-solvent. In some such examples, the mixture of the partially fluorinated cyclic ether and the first co-solvent may constitute a majority by volume of the total solvent mixture in electrolyte 14 (i.e., the mixture of the partially fluorinated cyclic ether and the first co-solvent may constitute greater than 50 volume percent (vol. %) of the total solvent mixture in electrolyte 14). In some examples, the second co-solvent may be selected from the group consisting of ethers, e.g., linear or cyclic aliphatic ethers; nitriles; amides; and combinations thereof, and the second co-solvent may be different than the first co-solvent. Examples of the second co-solvent include 1,2-dimethoxyethane, monoglyme, diglyme, triglyme, tetraglyme, NMP, dimethyl acetamide, pivalonitrile, and acetonitrile. In some examples, the second co-solvent may constitute the balance of the solvent mixture.

In some examples, the solvent mixture of electrolyte 14 does not include a cyclic carbonate ester, a sulfolane, or a sulfolane derivative. For example, the solvent mixture may be substantially or essentially free of cyclic carbonate esters, sulfolanes, and sulfolane derivatives.

Electrolyte 14 also includes lithium salts solvated in the solvent mixture. Example lithium salts include LiPF$_6$, LiClO$_4$, lithium bis(trifluoromethanesulfonyl)imide (LiTFSI), LiBF$_4$, LiAsF$_6$, LiN(SO$_2$CF$_3$)$_2$, LiSO$_3$CF$_3$, and/or other salts suitable for use in a metal-air and/or metal-oxygen battery. The lithium salts may dissociate in the solvent mixture to form Li+ ions 18 in electrolyte.

In operation of Li—O$_2$ battery 10, cathode 16 is fed oxygen molecules 20 by an oxygen source 29. The oxygen source may be fluidly connected to a side of cathode 16 away from electrolyte 14. It is currently understood that the fundamental rechargeable cathode discharge reaction in an aprotic lithium-oxygen battery 10 is:

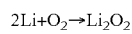

Hence, insoluble Li$_2$O$_2$ 22 is formed via the oxygen reduction reaction (ORR) during the discharge reactions. The discharge reactions cause a voltage difference between anode 12 and cathode 16. During recharge of the Li—O$_2$ battery 10, a voltage is applied to anode 12 and cathode 16 via voltage source 26, and oxygen is evolved by decomposition of Li$_2$O$_2$ to Li$^+$ ions 18 via the oxygen evolution reaction (OER).

EXAMPLES

Comparative Example 1

Figure 2:
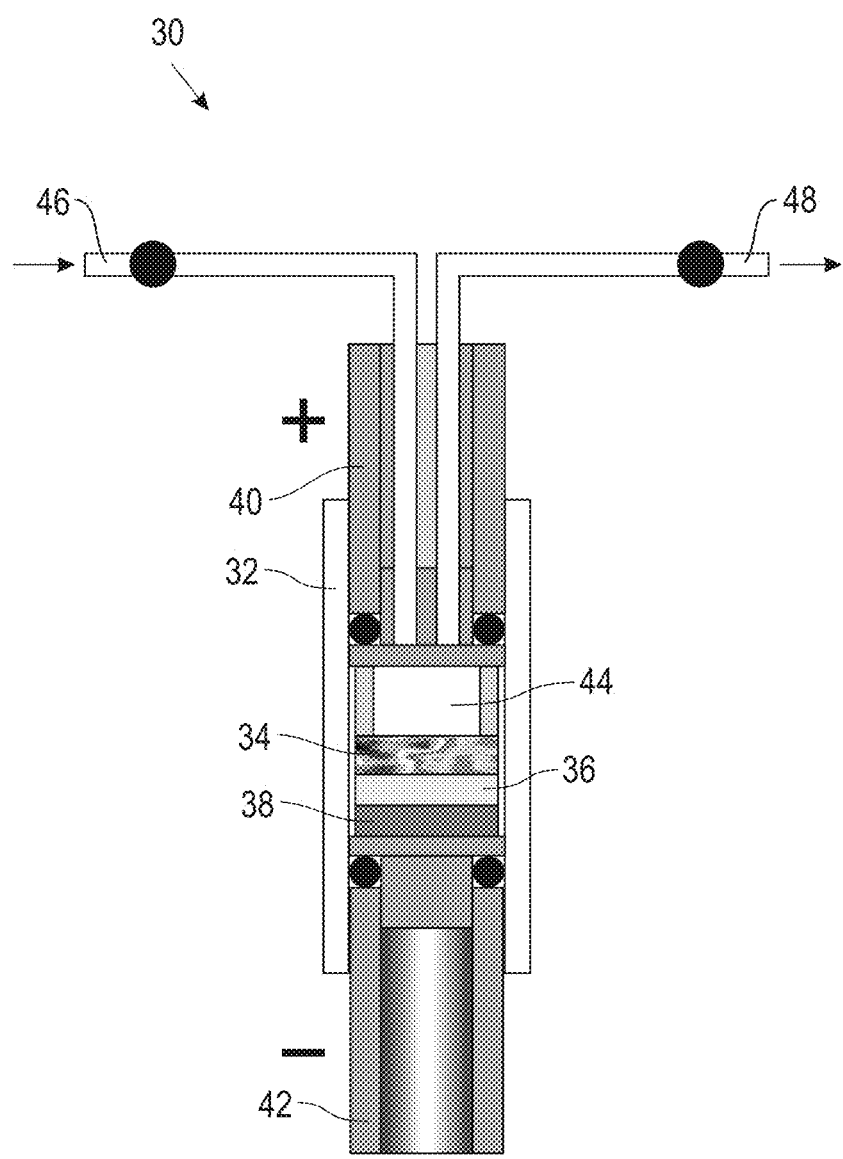
FIG. 2 is a conceptual and schematic diagram illustrating an example of a lithium-oxygen battery with a Swagelok® type geometry.

FIG. 2 is a conceptual and schematic diagram illustrating an example of a Li—O$_2$ battery with a Swagelok® type geometry. Li—O$_2$ battery 30 includes quartz tubing 32 forming a package for cathode 34, electrolyte/separator 36, and Li anode 38. Li metal anode 38 was about 248 microns thick. Electrolyte/separator 36 included a monolayer polypropylene separator available under the trade designation Celgard® 2400 from Celgard, LLC, Charlotte, N.C., soaked in different electrolytes, depending on the test, as described below. Cathode 34 included different constructions depending on the test, as described below.

A positive terminal 40 was electrically connected to cathode 34, and a negative terminal 42 was electrically connected to Li anode 38. Above cathode 34 was a head space 44 for oxygen entering Li—O$_2$ battery 30 from oxygen inlet 46 and gases exiting Li—O$_2$ battery 30 via outlet 48.

Li—O$_2$ battery 30 was used to conduct testing of various solvents for use in the electrolyte. A measure of the rechargeability of Li—O$_2$ battery 10 is the ratio between the amount of oxygen evolved during charge and the amount of oxygen consumed during discharge of Li—O$_2$ battery 10 (OER/ORR). For an ideal Li—O$_2$ battery 10, the OER/ORR ratio would be 1.0 (i.e., all oxygen consumed during discharge is evolved during charge of equal Coulometric capacity). However, the OER/ORR ratio may be less than one due to, for example, reactions between oxygen species and solvent in electrolyte 14. By increasing stability of the solvent in electrolyte 14, TFDOL may increase the OER/ORR ratio.

Other measures of rechargeability of Li—O$_2$ battery 10 include (i) the ratio of carbon dioxide evolved compared to oxygen consumed during discharge of Li—O$_2$ battery 10 (CO$_2$/ORR) and (ii) the ratio of hydrogen evolved compared to oxygen consumed during discharge of Li—O$_2$ battery 10 (H$_2$/ORR). As shown in Table 1, for all solvents investigated, the OER/ORR ratio is less than one and the CO$_2$/ORR and H$_2$/ORR ratios are greater than zero. This indicates less than ideal rechargeability.

TABLE 1

| Cathode | Solvent | Li Salt | OER/ORR | CO$_2$/ORR | H$_2$/ORR |
|---|---|---|---|---|---|
| P50 | MPP-TFSI | TFSI | 0.33 | 0.01 | 0.28 |
| P50 | DMSO | TFSI | 0.51 | 0.03 | 0.02 |
| XC72 | 1NM3 | TFSI | 0.48 | 0.11 | 0.04 |

TABLE 1-continued

| Cathode | Solvent | Li Salt | OER/ORR | CO$_2$/ORR | H$_2$/ORR |
|---|---|---|---|---|---|
| XC72 | NMP | TFSI | 0.58 | 0.03 | 0.02 |
| XC72 | THF | TFSI | 0.72 | 0.03 | 0.09 |
| KB | DME | TFSI | 0.76 | 0.05 | 0.03 |
| XC72 | DME | TFSI | 0.78 | 0.06 | 0.01 |
| P50 | CH$_3$CN | BF$_4$ | 0.88 | 0.04 | 0.01 |
| XC72 | Triglyme | BF$_4$ | 0.75 | 0.03 | 0.08 |

In Table 1, P50 refers to a cathode utilizing stand-alone carbon paper available under the trade designation AvCarb® P50, from AvCarb® Material Solutions, Lowell, Mass. XC72 refers to a cathode utilizing a stainless steel mesh with PTFE binding a carbon black available under the trade designation Vulcan® XC72, from Cabot Corporation, Boston, Mass. KB refers to a cathode utilizing a stainless steel mesh with PTFE binding a carbon black available under the trade designation Ketjenblack® from AkzoNobel Polymer Chemicals LLC, Chicago, Ill.

DME refers to dimethoxyethane, THF refers to tetrahydrofuran, TGE refers to triglyme, CH$_3$CN refers to acetonitrile, DMSO refers to dimethyl sulfoxide, NMP refers to N-methyl pyrrolidone, 1NM3 refers to tri(ethylene glycol)-substituted trimethylsilane, and MPP-TFSI refers to N-methyl-N-propylpiperidinium bis(trifluoromethylsulfonyl)imide. TFSI refers to lithium bis(trifluoromethan sulfonyl)imide, and BF$_4$ refers to lithium tetrafluoroborate.

As shown in Table 1, the electrolytes studied have led to batteries with limited rechargeability, as OER/ORR is always <0.9, and CO$_2$/ORR and H$_2$/ORR>0.

Comparative Example 2

Figure 3A:
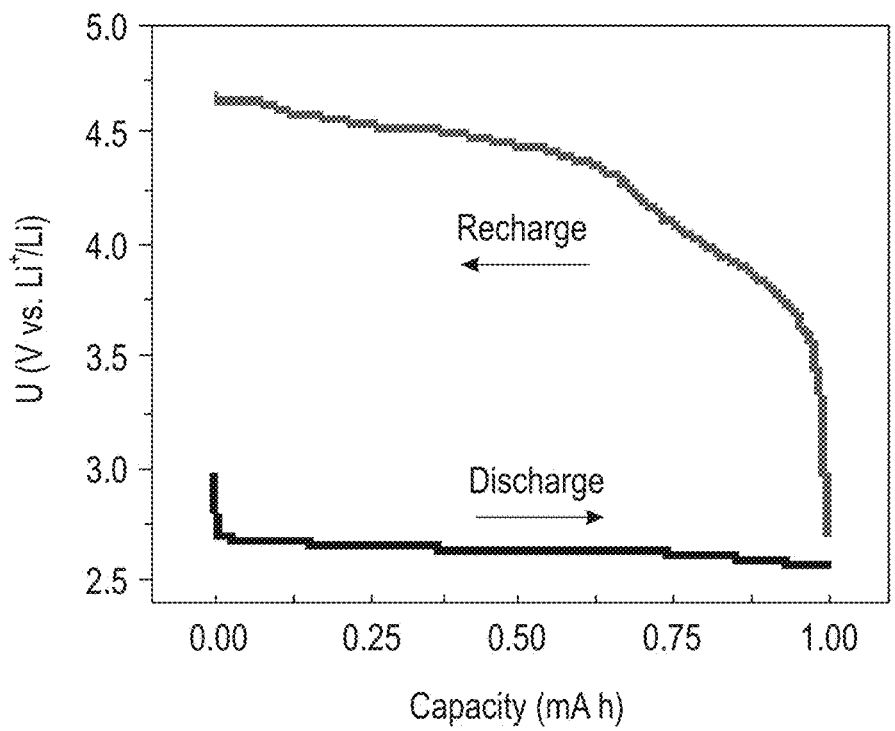
FIG. 3A is a plot of discharge and recharge behavior of an example of a lithium-oxygen battery with a cathode including carbon.
Figure 3B:
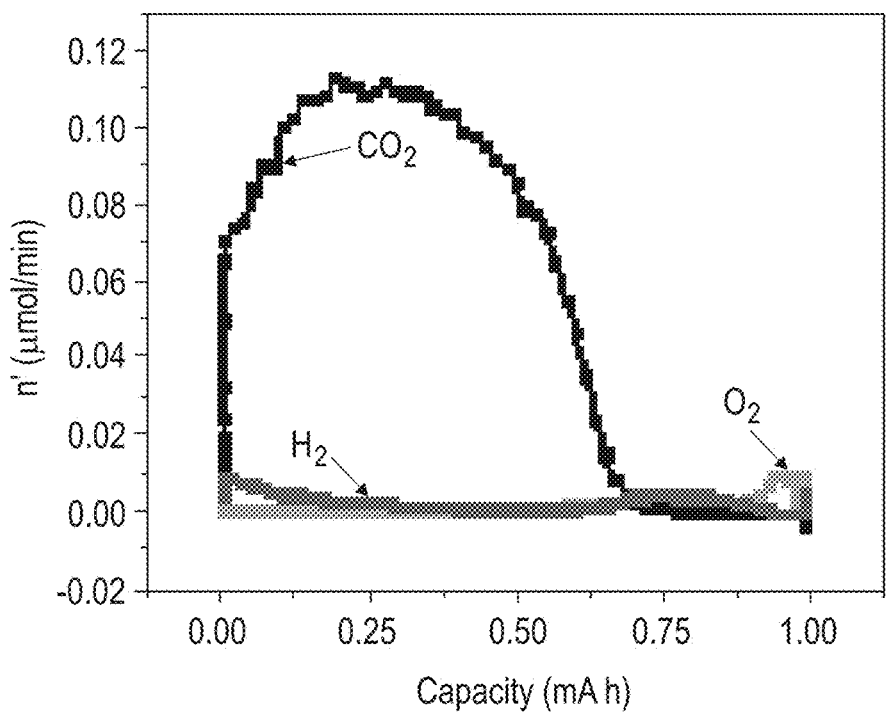
FIG. 3B is a plot of gas evolution during charge of an example of a lithium-oxygen battery.

FIG. 3A is a plot of discharge and recharge behavior of an example of a Li—O$_2$ battery with an electrolyte including 0.1 N LiTFSI salt in a 1:1 (by volume) mixture of TFDOL and propylene carbonate. FIG. 3B is plot of gas evolution during discharge of an example of a Li—O$_2$ battery with an electrolyte including 0.1 N LiTFSI salt in a 1:1 (by volume) mixture of TFDOL and propylene carbonate. The Li—O$_2$ battery had the Swagelok® geometry described above with respect to FIG. 2 and utilized a cathode including a stainless steel mesh with PTFE binding a carbon black available under the trade designation Ketjenblack®. The Li—O$_2$ battery was discharged at 0.2 mA for 5 h. As FIG. 3B illustrates, the total oxygen evolution corresponds to 5% of the oxygen consumed during discharge.

Example 1

Figure 4A:
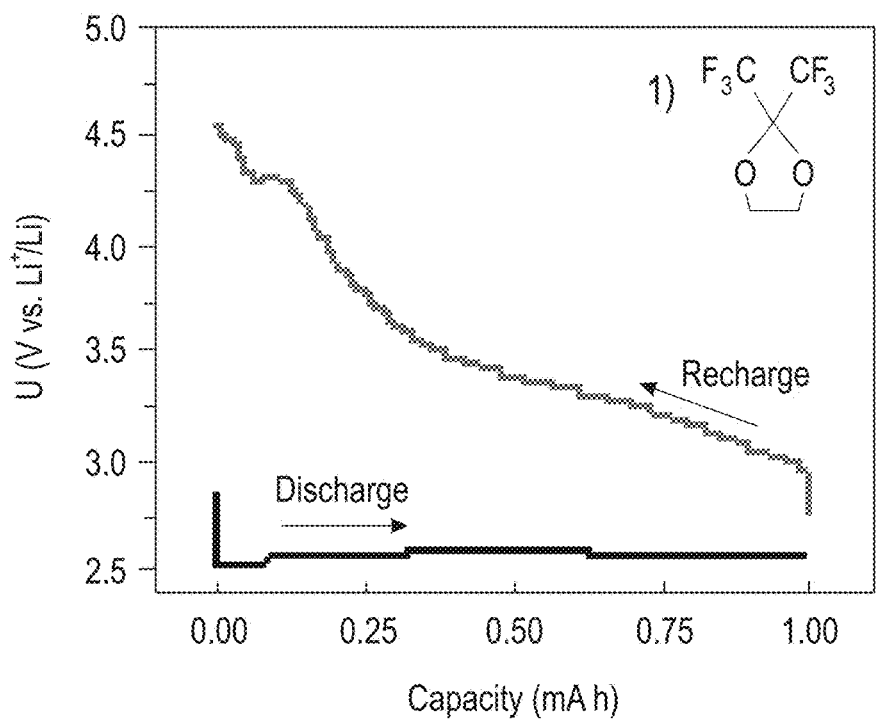
FIG. 4A is a plot of discharge and recharge behavior of an example of a lithium-oxygen battery with a cathode including carbon.
Figure 4B:
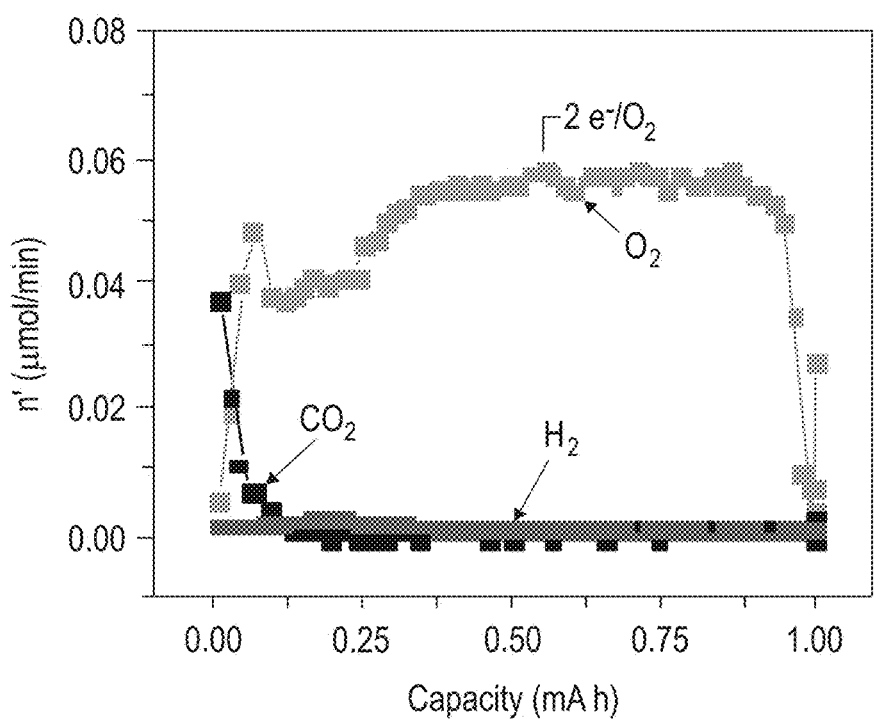
FIG. 4B is a plot of gas evolution during charge of an example of a lithium-oxygen battery.

FIG. 4A is a plot of discharge and recharge behavior of an example of a Li—O$_2$ battery with an electrolyte including 0.1 N LiTFSI salt in a 30:1 (by volume) mixture of TFDOL and DME. FIG. 4B is plot of gas evolution during discharge of an example of a Li—O$_2$ battery with an electrolyte including 0.1 N LiTFSI salt in a 30:1 (by volume) mixture of TFDOL and DME. The Li—O$_2$ battery had the Swagelok® geometry described above with respect to FIG. 2 and utilized a lithium metal anode, a Whatman glass fiber filter imbibed with the TFDOL/DME electrolyte, and a cathode prepared by spraying a PTFE/Ketjenblack® carbon powder mixture onto a stainless steel mesh and drying the cathode in a vacuum oven at 150° C. The Li—O$_2$ battery was discharged at 0.2 mA for 5 h. As shown in FIG. 4B, the total oxygen evolution corresponds to 83% of the oxygen consumed during discharge.

Example 2

Table 2 shows a comparison of the charging and discharging performance of a Li—O$_2$ battery utilizing different solvents for the electrolyte. The Li—O$_2$ battery had the Swagelok® geometry described above with respect to FIG. 2 and utilized a lithium metal anode, a Whatman glass fiber filter imbibed with the electrolyte, and a cathode prepared by spraying a PTFE/Ketjenblack® carbon powder mixture onto a stainless steel mesh and drying the cathode in a vacuum oven at 150° C. As shown in Table 2, when pure NMP was used as the solvent, the OER/ORR ratio was 0.59 and only 1 discharge-charge cycle (of 1 mAh at 0.2 mA for 5 h) could be performed prior to the discharge potential falling below 2 V. In comparison, when a 1:1 (by volume) mixture of TFDOL:NMP (N-methyl pyrrolidone) was used as the solvent, the OER/ORR ratio increased to 0.66 and 6 discharge-charge cycles (of 1 mAh at 0.2 mA for 5 h) could be performed prior to the discharge potential falling below 2 V. By increasing the TFDOL:NMP volumetric ratio to 5:1, the OER/ORR ratio increased to 0.78 and 9 discharge-charge cycles (of 1 mAh at 0.2 mA for 5 h) could be performed prior to the discharge potential falling below 2 V.

TABLE 2

| Solvent | Li+ salt | OER/ORR | # Cycles |
|---|---|---|---|
| NMP | LiNO$_3$ | 0.59 | 1 |
| 1:1 TFDOL:NMP | LiNO$_3$ | 0.66 | 6 |
| 5:1 TFDOL:NMP | LiNO$_3$ | 0.78 | 9 |

Various examples have been described. These and other examples are within the scope of the following claims.

The invention claimed is:

1. A battery employing lithium-oxygen chemistry comprising:
    an anode comprising lithium;
    an electrolyte comprising:
        a lithium-containing salt,
        2,2-bis(trifluoromethyl)-1,3-dioxolane, and
        a co-solvent selected from the group consisting of ethers, amides, nitriles, and combinations thereof, wherein the electrolyte does not include a cyclic carbonate ester, a sulfolane, or a sulfolane derivative; and
    a porous cathode allowing oxygen to come into contact with the electrolyte.

2. The battery of claim 1, wherein the volume ratio of 2,2-bis(trifluoromethyl)-1,3-dioxolane to the co-solvent is between about 30:1 and about 1:1.

3. The battery of claim 1, wherein the volume ratio of 2,2-bis(trifluoromethyl)-1,3-dioxolane to the co-solvent is between about 30:1 and about 5:1.

4. The battery of claim 1, wherein the volume ratio of 2,2-bis(trifluoromethyl)-1,3-dioxolane to the co-solvent is between about 20:1 and about 10:1.

5. The battery of claim 1, wherein the lithium salt is selected from the group consisting of LiPF$_6$, LiClO$_4$, LiTFSI, LiBF$_4$, LiAsF$_6$, LiN(SO$_2$CF$_3$)$_2$, LiSO$_3$CF$_3$, and combinations thereof.

6. The battery of claim 1, wherein the co-solvent is selected from the group consisting of 1,2-dimethoxyethane, diglyme, triglyme, tetraglyme, N-methyl-2-pyrrolidone (NMP), dimethyl acetamide, pivalonitrile, acetonitrile, and combinations thereof.

7. The battery of claim 1, wherein the electrolyte consists essentially of the lithium-containing salt; 2,2-bis(trifluoromethyl)-1,3-dioxolane; and the co-solvent.

* * * * *